Patented May 29, 1951

2,555,236

UNITED STATES PATENT OFFICE 2,555,236

PROCESS OF CANNING FISH AND SHELLFISH AND RESULTANT PRODUCT

Ekkehard L. Kreidl, Boston, and Earl P. McFee, Gloucester, Mass., assignors, by direct and mesne assignments, to Gorton-Pew Fisheries Company, Ltd., Gloucester, Mass., a corporation of Massachusetts No Drawing. Application December 10, 1949, Serial No. 132,412

19 Claims. (Cl. 99—188)

This invention relates to the treatment of fish and shell fish, and more particularly to their treatment with water soluble glassy phosphates to prevent the formation of struvite crystals when canned.

It is well known that canned cooked shell fish, such as lobsters, shrimp and crab meat, as well as canned fish, such as haddock, cod and other members of the Gadidae family, and salmon, develop transparent crystals known as struvite upon standing. Fish having a high oil content, such as tuna, mackerel or the like, or fish canned in oil, have less tendency to form these crystals. While not harmful, either chemically or physically, struvite crystals do resemble glass and, when present, render canned fish and shell fish unfit to eat in the opinion of many people.

Struvite chemically is hydrated magnesium ammonium phosphate with the theoretical chemical formula $Mg(NH_4)(PO_4).6H_2O$, and it is crystals of this composition that slowly form in canned fish and shell fish upon standing, usually on the inside surface of the can, and on the surface of the meat. The amount of magnesium ions, ammonium ions, and phosphate ions in the flesh of the fish and shell fish, and in the surrounding fluid or juice, varies considerably with the type of product and the method of canning it, but is generally sufficient to form struvite crystals.

It is an object, therefore, of this invention to prevent the formation of struvite crystals in canned fish and shell fish.

This and other objects which will become apparent may be attained by adding to the fish and shell fish water soluble glassy alkali phosphates in an amount at least sufficient to keep in solution all the magnesium present in the liquid juice of the product.

It has been found that a water soluble glassy phosphate increases the solubility of magnesium compounds and thus increases the useful shelf life of canned fish and shell fish or, if desired, entirely prevents the formation of struvite crystals therein. Extensive analyses of various canned fish and shell fish disclose a wide variation in the magnesium compound content up to having an equivalent magnesium content as high as 0.040% of the total weight.

In practice it has been found that the addition of 0.25% to 2% of a water soluble glassy alkali phosphate such as sodium hexametaphosphate [$Na_6(PO_3)_6$] based upon the weight of the moisture content in canned shell fish and fish will suppress the formation of struvite crystals effectively. Amounts of ½% to 1½% generally have been found as the useful range for commercially canned products. Equivalents for hexametaphosphate are sodium tripolyphosphate, $(Na_5P_3O_{10})$ or the potassium or alkali double salt equivalents of these compounds and other equivalent water soluble glassy phosphates. Generally speaking, smaller quantities of the potassium compounds are required for equal performance as compared with the sodium compounds. If the magnesium content of the product has been determined, it has been found that additions of 50 times the weight of magnesium of sodium hexametaphosphate or corresponding amounts of other water soluble glassy phosphates will prevent struvite formation.

Originally all the magnesium is, of course, present as a part of the flesh and bone of the shell fish or fish. Normally after the shell fish or fish has been canned a slow process of release of magnesium ions lasting from about three to six years takes place, and struvite crystals gradually build up. Apparently the magnesium, ammonium, and phosphate ions are gradually released into the juice and struvite crystals form to remove these ions from solution. To suppress or prevent the formation of struvite, it has been found that the addition of a water soluble glassy phosphate is required. The exact amount of glassy phosphate added is dependent upon the shelf life desired and upon the total amount of magnesium available for struvite formation. If indefinite shelf life is desired, there must be sufficient of the glassy phosphate to insure solubility of all the magnesium. If it is sufficient to insure a relatively long shelf life less glassy phosphate is required. Additions insufficient to put all the magnesium in solution will reduce the amount of crystals formed and they will be smaller, and therefore less undesirable. In any case at least 0.25% by weight of glassy phosphate based on the moisture content is required to obtain any appreciable results.

As stated above, the magnesium content of fish and shell fish varies considerably. It is evident that more glassy phosphate is required for high magnesium content products to obtain equivalent results than for low magnesium content products. Experimentally, it has been found that where any appreciable struvite formation occurs amounts of from ½% to 1½% gave generally satisfactory results regardless of the magnesium content.

The invention described herein is particularly applicable to the canning of seafood as the problem with such food appears to be most acute. In particular it has been found that salmon and members of the Gadidae family, as well as crab, lobster and shrimp are particularly troublesome and struvite formation in these foods is readily controlled by our process.

In the practice of our invention we find that it is most convenient to prepare and cook the shell fish or fish in the usual manner as by autoclaving, but the method of cooking is immaterial. The glassy phosphate may be added at any time prior to closing the cans, and conveniently may be added to the fish or shell fish either just prior to autoclaving, or just prior to filling the can. It is preferred that the addition be made at the end of the cooking period, together with the salt as a matter of convenience. When the cooking is completed, the fish or shell fish is placed in cans in the usual way and stored without any particular precautions.

To illustrate the invention further the following examples may be given:

Fish fillets were cooked in an autoclave at about 15 lbs. steam pressure for 20 minutes. The cooked fish was adjusted to a moisture content of 85% with broth made by boiling fish heads in water, and then ground to a fine mixture. The broth was used for the purpose of increasing the nutritional value.

To various portions of this mixture was added various amounts of sodium hexametaphosphate. One portion was adjusted to contain 0.25%, a second to contain 1.0% and a third 2.5% of the sodium hexametaphosphate by weight on the total moisture content of the product. After the addition of hexametaphosphate the mixture was stirred for 10 minutes and filled into 4 oz. cans. A portion to which nothing had been added was reserved as a control and also canned. The canned portions were sealed and autoclaved for one hour at 15 lbs. steam pressure. When tested 15 months later the control was found to contain 0.03% struvite crystals by weight, the 0.25% treated portion contained about 0.001% struvite crystals by weight and none of the remaining portions contained any struvite crystals.

The struvite determination was made in accordance with the following method: Fish material is mixed with about three times its volume of a 1.6 specific gravity aqueous sodium iodide solution so as to adjust the resulting liquid mixture to a specific gravity of about 1.46. In order to prevent struvite from dissolving during this treatment, this solution is slightly alkalized with sodium hydroxide. The mixture is then well stirred and subsequently allowed to settle for about one-half hour. Flesh and excess liquid is decanted from the residue which settles to the bottom, which residue contains bone fragments and struvite when such is present. This residue then is washed with the above sodium iodide solution and then with alcohol to remove any sodium iodide. The dried residue is then separated into struvite and bone in a mixture of carbon tetrachloride, and tetrabromoethane. This mixture is adjusted to a specific gravity of about 1.76 from which the struvite is removed as it is found floating at the top. The struvite then is dissolved in acid and the magnesium content determined by conventional analytical methods and the theoretical amount of struvite calculated.

We claim:

1. Canned food of the group consisting of fish and shell fish having incorporated therewith a water soluble glassy alkali phosphate in an amount sufficient to substantially suppress the crystallization of struvite.

2. The product in accordance with claim 1 wherein the water soluble glassy alkali phosphate is present in an amount of at least 0.25% by weight based on the total moisture content.

3. Canned food of the group consisting of fish and shell fish having incorporated therewith a water soluble glassy alkali phosphate in an amount equal to at least 50 times the amount of magnesium present in the canned product to substantially suppress the crystallization of struvite.

4. Canned fish having incorporated therewith a water soluble glassy alkali phosphate in an amount sufficient to substantially suppress the crystallization of struvite.

5. The product in accordance with claim 4 wherein the fish is salmon.

6. The product in accordance with claim 4 wherein the fish is a member of the Gadidae family.

7. Canned fish having incorporated therewith sodium hexametaphosphate in an amount of at least 0.25% by weight based on the total moisture content to substantially suppress the crystallization of struvite.

8. Canned salmon having incorporated therewith sodium hexametaphosphate in an amount of at least 0.25% by weight based on the total moisture content to substantially suppress the crystallization of struvite.

9. Canned fish of the Gadidae family having incorporated therewith sodium hexametaphosphate in an amount equal to at least 0.25% by weight based on the total moisture content to substantially suppress the crystallization of struvite.

10. Canned shell fish having incorporated therewith a water soluble glassy alkali phosphate in an amount sufficient to substantially suppress the crystallization of struvite.

11. Canned lobster having incorporated therewith sodium hexametaphosphate in an amount of at least 0.25% by weight based on the total moisture content to substantially suppress the crystallization of struvite.

12. Canned crab meat having incorporated therewith sodium hexametaphosphate in an amount of at least 0.25% by weight based on the total moisture content to substantially suppress the crystallization of struvite.

13. In the process of canning food of the group consisting of fish and shell fish the step of adding to said food prior to sealing a water soluble glassy alkali phosphate in an amount sufficient to substantially suppress the crystallization of struvite.

14. In the process of canning food of the group consisting of fish and shell fish the step of adding to said food prior to sealing the cans a water soluble glassy alkali phosphate in an amount of at least 0.25% by weight based on the total moisture content to substantially suppress the crystallization of struvite.

15. In the process of canning food of the group consisting of fish and shell fish the step of adding to said food prior to sealing the cans a water soluble glassy alkali phosphate in an amount of at least 50 times the weight of magnesium present in the food to be canned to substantially suppress the crystallization of struvite.

16. In the process of canning fish the step of adding to said fish prior to sealing the cans a water soluble glassy alkali phosphate in an amount of at least 0.25% by weight based on the total moisture content to substantially suppress the crystallization of struvite.

17. The process in accordance with claim 16 wherein the water soluble glassy alkali phosphate is sodium hexametaphosphate.

18. The process in accordance with claim 17 wherein the fish is salmon.

19. In the process of canning shell fish the step of adding to said shell fish prior to sealing the cans an alkali hexametaphosphate in an amount of at least 0.25% by weight based on the total moisture content to substantially suppress the crystallization of struvite.

EKKEHARD L. KREIDL.
EARL P. McFEE.

REFERENCES CITED

The following references are of record in the file of this patent:

UNITED STATES PATENTS

| Number | Name | Date |
| --- | --- | --- |
| 2,064,110 | Hall | Dec. 15, 1936 |
| 2,082,573 | Hall | June 1, 1937 |
| 2,305,263 | Latshaw | Dec. 15, 1942 |
| 2,366,857 | Hurka | Jan. 9, 1945 |